United States Patent
Cho et al.

(10) Patent No.: US 7,175,937 B2
(45) Date of Patent: Feb. 13, 2007

(54) SEPARATOR HAVING INORGANIC PROTECTIVE FILM AND LITHIUM BATTERY USING THE SAME

(75) Inventors: Chung-kun Cho, Kyungki-do (KR); Jong-ki Lee, Seoul (KR); Jea-woan Lee, Kyungki-do (KR); Sang-mock Lee, Kyungki-do (KR)

(73) Assignee: Samsung SDI Co., Ltd., Suwon (KR)

( * ) Notice: Subject to any disclaimer, the term of this patent is extended or adjusted under 35 U.S.C. 154(b) by 407 days.

(21) Appl. No.: 10/622,468

(22) Filed: Jul. 21, 2003

(65) Prior Publication Data

US 2004/0106037 A1   Jun. 3, 2004

(30) Foreign Application Priority Data

Nov. 2, 2002   (KR) .................. 10-2002-0067680

(51) Int. Cl.
*H01M 6/04*   (2006.01)

(52) U.S. Cl. .................. 429/126; 429/129; 429/144; 429/249; 427/126.1; 427/126.2; 427/126.3

(58) Field of Classification Search ............. 429/126, 429/144, 129, 249; 427/126.1, 12, 126.3, 427/126.2
See application file for complete search history.

(56) References Cited

U.S. PATENT DOCUMENTS

| 4,888,258 A | * | 12/1989 | Desjardins et al. ......... 429/306 |
| 4,965,146 A | * | 10/1990 | McCullough et al. ....... 429/112 |
| 6,025,094 A | * | 2/2000 | Visco et al. ............. 427/126.3 |
| 6,413,284 B1 | * | 7/2002 | Chu et al. .................... 429/232 |

FOREIGN PATENT DOCUMENTS

| JP | 2001-319634 | 11/2001 |
| WO | 01/33651 A1 | 5/2001 |

OTHER PUBLICATIONS

Korean Patent Office Action and English Translation.
Chinese Office Action dated Dec. 31, 2004, and English Translation.

* cited by examiner

*Primary Examiner*—Laura Weiner
(74) *Attorney, Agent, or Firm*—Buchanan Ingersoll & Rooney PC

(57) ABSTRACT

Provided are a separator having an inorganic protective film and a lithium battery using the separator. The separator has suppressed self discharge and reduced internal shorting.

3 Claims, 3 Drawing Sheets

SEPARATOR HAVING INORGANIC PROTECTIVE FILM AND LITHIUM BATTERY USING THE SAME

This application claims the priority of Korean Patent Application No. 2002-67680, filed Nov. 2, 2002, in the Korean Intellectual Property Office, the disclosure of which is incorporated herein in its entirety by reference.

BACKGROUND OF THE INVENTION

1. Field of the Invention

The present invention relates to a separator having an inorganic protective film and a lithium battery using the same, and more particularly, to a separator having an inorganic protective film with suppressed self discharge and reduced internal short, and a lithium battery using the same.

2. Description of the Related Art

With development of lightweight, high-function portable electronic devices such as video cameras, cellular phones, notebook PCs and the like, batteries used as driving sources thereof have been extensively studied. In particular, rechargeable lithium batteries have attracted much attention and development thereof are briskly under way because they have approximately three times a higher energy density than conventional batteries such as Ni—Cd batteries, Ni—H batteries or Ni—Zn batteries and are capable of charging rapidly.

An electrochemical cell of a battery is basically composed of a cathode, an anode and a separator interposed therebetween. During discharge, oxidation takes place at the anode, and reduction takes place at the cathode. Lithium ions generated during oxidation and reduction migrate through an electrolyte which is impregnated in pores of the separator. The cathode and the anode are not electrically contacted to each other by the separator, so that electrons cannot move directly between the anode and the cathode.

The porous separator used in a cell should be chemically stable in an electrolytic solution, and useful examples thereof include polyolefins such as polyethylene or polypropylene, glass fiber filter paper or ceramic materials. In particular, like in a cylindrical battery in which a separator is wound circularly, the separator must have sufficient flexibility. Also, along with the high energy density trend, a separator must have a mechanical strength even with a reduced thickness.

In the case where a cathode active material is easily dissolved in an electrolytic solution to thereby be able to move easily, a separator must be equipped with a function of shutting down a cathode active material. In a lithium sulfur battery, in particular, sulfur used as a cathode active material forms lithium polysulfide which is easily dissolved in an electrolytic solution during charge and discharge. The lithium polysulfide moves to an anode and reacts with metallic lithium to form side reactant materials, lowering a storage characteristic of a cell. In other words, a severe self discharge problem occurs.

In such a case, a reduction in capacity due to self discharge can be noticeably suppressed by shutting down movement of lithium polysulfide. To this end, a polymer such as poly(ethylene oxide), poly(propylene oxide), poly(vinylidenefluoride), poly(tetrafluoroethane) or poly(acrylonitrile) is coated on the surface of a separator, thereby retarding movement of a cathode active material to some extent. Shutting down of the active material is restricted due to swelling of the polymer used. To overcome this problem, a polymer that does not causing swelling may be used. However, in such a case, ion permeation is also inhibited, making it difficult to realize battery performance.

SUMMARY OF THE INVENTION

The present invention provides a lithium battery using a separator having an inorganic protective film which can reduce self discharge by suppressing movement of a cathode active material.

In an aspect of the present invention, there is provided a lithium battery comprising a cathode, an anode, and a separator interposed between the cathode and the anode, wherein an inorganic protective film is formed on at least one surface of the separator.

In an embodiment of the present invention, the inorganic protective film is single-ion conducting glass having lithium-ion conductivity.

The inorganic protective film may be at least one selected from the group consisting of lithium nitride, lithium silicate, lithium borate, lithium aluminate, lithium phosphate, lithium phosphorus oxynitride, lithium silicosulfide, lithium germanosulfide, lithium lanthanum oxide, lithium titanium oxide, lithium borosulfide, lithium aluminosulfide, lithium phosphosulfide, and mixtures thereof.

Preferably, the inorganic protective film is lithium nitride, lithium phosphate, or lithium phosphorus oxynitride.

The inorganic protective film may have a thickness of 0.01 to 5 µm. The inorganic protective film preferably has a thickness of 0.1 to 1 µm.

The inorganic protective film may be formed by gas reaction, thermal deposition, sputtering, chemical vapor deposition, plasma enhance chemical vapor deposition, laser chemical vapor deposition, ion plating, cathodic arc, jet vapor deposition or laser ablation.

The separator may be a polyethylene separator, a polypropylene separator, a polyethylene/polypropylene double-layered separator, a polyethylene/polypropylene/polyethylene triple-layered separator, a polypropylene/polyethylene/polypropylene triple-layered separator, glass fiber filter paper, or a ceramic separator.

BRIEF DESCRIPTION OF THE DRAWINGS

The above aspect and advantages of the present invention will become more apparent by describing in detail preferred embodiments thereof with reference to the attached drawings in which.

DETAILED DESCRIPTION OF THE INVENTION

The present invention relates to a separator for a lithium battery, in which an inorganic protective film is formed on the surface of the separator to form a separator/inorganic film structure, thereby suppressing movement of a cathode active material. If the separator/inorganic film structure inhibits movement of the cathode active material, self discharge and a reduction in capacity of a battery can be suppressed.

A separator used in a battery inhibits electrons from flowing directly from a cathode to an anode or vice versa and provides a space for ion passage. Generally, a separator has many pores and a liquid electrolytic solution is impregnated into the pores, allowing ions to easily move through the electrolytic solution. If the cathode active material is dissolved in an electrolytic solution, however, the porous separator cannot inhibit movement of cathode active material and reacts with anode materials, resulting in a reduction in capacity of a battery.

Figure 1:
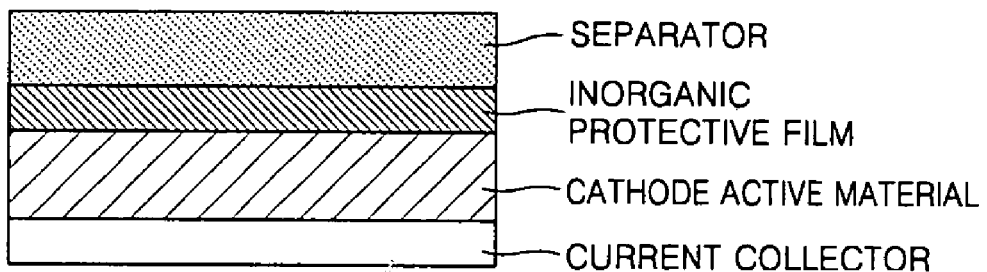
FIG. 1 is a cross-sectional view of an electrolyte having an inorganic protective film formed between a porous separator and a cathode active material formed on a base substrate.
Figure 2:
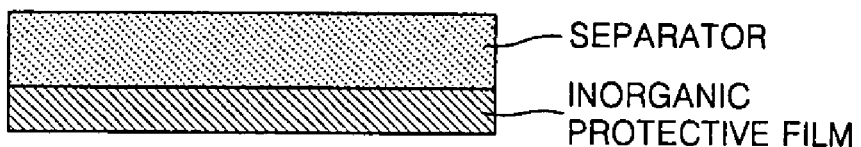
FIG. 2 is a cross-sectional view of an inorganic protective film formed on the surface of a porous separator impregnated with an electrolyte.
Figure 3:
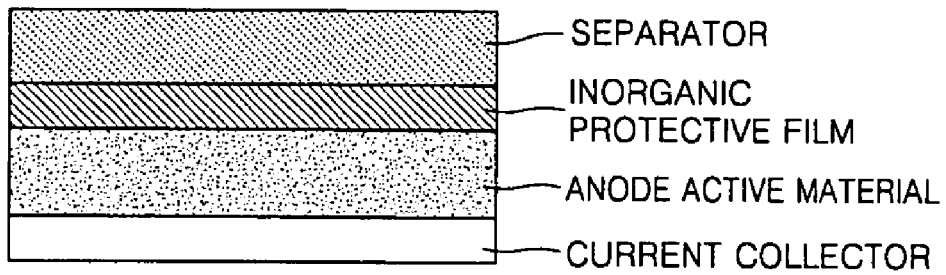
FIG. 3 is a cross-sectional view of an electrolyte having an inorganic protective film formed between a porous separator and an anode active material formed on a base substrate.

The inorganic protective film according to the present invention is formed on at least one surface of a separator and inhibits movement of a cathode active material, thereby suppressing self discharge and a reduction in capacity of a battery. The inorganic protective film may be formed on both surfaces or one surface of the separator. In the case where the inorganic protective film is formed on only one surface of the separator, it may be positioned between a cathode and a separator, as shown in FIG. 1, or between an anode and a separator, as shown in FIG. 3.

In the separator/inorganic protective film structure, the separator imparts the inorganic protective film with flexibility and strength. In other words, the inorganic protective film itself is very weak so that it may be easily brittle or damaged during handling. However, the separator present in the separator/inorganic protective film structure considerably compensates for such weakness. Also, the separator/inorganic protective film structure has excellent adhesion between the separator and the inorganic protective film, which is attributed to mechanical interlocking between the pores of a porous separator and the inorganic protective film.

Unlike the conventional polymer, the inorganic protective film has several advantages in that while little swelling occurs, it serves as a single-ion conductor that inhibits a cathode active material from moving and allows only lithium ions to pass. Also, the inorganic protective film is stable in an electrolytic solution.

Thus, the inorganic protective film is selected in consideration of various factors, and examples thereof useful in the present invention include various materials having good lithium-ion conductivity, exemplified by lithium nitride, lithium silicate, lithium borate, lithium aluminate, lithium phosphate, lithium phosphorus oxynitride, lithium silicosulfide, lithium germanosulfide, lithium lanthanum oxide, lithium titanium oxide, lithium borosulfide, lithium aluminosulfide, lithium phosphosulfide or mixtures thereof. Specifically, lithium nitride, lithium phosphate or lithium phosphorous oxynitride is preferred. In particular, lithium nitride ($Li_3N$) is more preferably used, because it has a very high ionic conductivity, that is, $10^{-3}$ S/cm, allowing a thicker layer to be processed, thereby suppressing generation of pinholes.

The inorganic protective film is formed on the separator to a thickness of 0.01 to 5 μm, preferably 0.1 to 1 μm. If the thickness of the inorganic protective film is less than 0.01 μm, surface coating is not properly performed due to generation of pinholes. If the thickness of the inorganic protective film is greater than 5 μm, internal resistance undesirably increases, energy density is lowered, and the inorganic protective film becomes weaker, making it easy to be broken during winding.

The inorganic protective film may be formed on the separator by subjecting the above-described materials having a high lithium ion conductivity to any suitable technique such as for example gas reaction, thermal deposition, sputtering, chemical vapor deposition, plasma enhanced chemical vapor deposition, laser enhanced chemical vapor deposition, ion plating, cathodic arc, jet vapor deposition or laser ablation.

The inorganic protective film may be formed on the separator by gas reaction, thermal deposition or sputtering.

Alternatively, the inorganic protective film can be formed on the separator by a method comprising:

1) depositing a lithium metal on the separator; and
2) contacting the separator having the lithium metal deposited thereon with $N_2$, $SO_2$, $CO_2$ or $O_2$ to form the inorganic protective film.

The use of the two-step process can prevent damage of a separator due to heat.

The method of forming the inorganic protective film using the two-step process will now be described in more detail.

First, a lithium metal is deposited on a separator to give a separator/lithium deposited product, and the resulting product is exposed to nitrogen gas to cause a gas reaction, thereby forming $Li_3N$. The formation speed of the $Li_3N$ varies depending on the pressure of nitrogen gas. As the pressure of the nitrogen gas increases, the formation speed increases. Thus, a higher pressure of nitrogen is advantageous in view of formation speed of an inorganic protective film.

Examples of the separator useful in the present invention include, but are not limited to, a polyethylene separator, a polypropylene separator, a polyethylene/polypropylene double-layered separator, a polyethylene/polypropylene/polyethylene triple-layered separator, a polypropylene/polyethylene/polypropylene triple-layered separator, glass fiber filter paper, or ceramic separator.

The separator having the inorganic protective film according to the present invention can be applied to all kinds of general lithium batteries. Here, the lithium batteries generally refer to either lithium primary batteries or lithium secondary batteries, e.g., a lithium ion battery, a lithium polymer battery, a lithium sulfur battery and so on. Also, in view of shape, both cylindrical batteries and rectangular batteries are applicable.

A method of manufacturing a lithium battery according to an embodiment of the present invention will now be described.

First, a cathode and an anode are prepared by a general method used in the manufacture of a lithium battery, respectively. The cathode includes at least one selected from the group consisting of a lithium composite oxide, simple substance sulfur, catholyte having $Li_2S_n (n \geq 1)$ dissolved therein, organic sulfur and $(C_2S_x)_y$ (x is a number of 2.5–20 and $y \geq 2$). The anode is preferably a lithium metal electrode or a lithium metal alloy electrode.

Thereafter, a separator having the inorganic protective film according to the present invention is inserted between the cathode and the anode, followed by winding or stacking, thereby forming an electrode assembly. The resultant structure is put into a battery case, thereby completing assembling of a battery.

Then, an electrolytic solution having a lithium salt and an organic solvent is injected into the battery case accommodating the electrode assembly, thereby completing a lithium battery.

As the lithium salt in the electrolytic solution, any lithium salt that is generally used for the manufacture of a lithium battery can be used, and concrete examples thereof include the lithium salt is at least one selected from the group consisting of lithium perchlorate ($LiClO_4$), lithium tetrafluoroborate ($LiBF_4$), lithium hexafluorophosphate ($LiPF_6$), lithium trifluoromethanesulfonate ($LiCF_3SO_3$) and lithium bistrifluoromethanesulfonylamide ($LiN(CF_3SO_2)_2$), and the concentration thereof ranges from 0.5 to 2.0 M. If the concentration of the lithium salt is out of the range specified above, good ionic conductivity is not exhibited.

Examples of the organic solvent forming the electrolytic solution according to the present invention include at least one selected from the group consisting of polyglyme compounds, oxolane compounds, carbonate compounds, 2-fluorobenzene, 3-fluorobenzene, 4-fluorobenzene, dimethoxyethane and diethoxyethane.

Examples of the polyglyme compounds include at least one compound selected from the group consisting of diethyleneglycol dimethylether ($CH_3(OCH_2CH_2)_2OCH_3$: also called as "diglyme (DGM)"), diethyleneglycol diethylether ($C_2H_5(OCH_2CH_2)_2OC_2H_5$), triethyleneglycol dimethylether ($CH_3(OCH_2CH_2)_3OCH_3$) and triethyleneglycol diethylether ($C_2H_5(OCH_2CH_2)_3OC_2H_5$).

Examples of the dioxolane compounds include at least one compound selected from the group consisting of 1,3-dioxolane, 4,5-diethyl-dioxolane, 4,5-dimethyl-dioxolane, 4-methyl-1,3-dioxolane, and 4-ethyl-1,3-dioxolane.

Examples of the carbonate compounds include at least one compound selected from the group consisting of, ethylene carbonate, propylene carbonate, diethyl carbonate, dimethylcarbonate, Γ-butyrolactone, methyl ethyl carbonate, and vinylene carbonate.

Examples of the organic solvent include ethylene carbonate (EC), propylene carbonate (PC), dimethylcarbonate (DMC), ethyl methyl carbonate (EMC) and mixtures thereof; and diethyleneglycol dimethylether ((DGM) (to be also called "diglyme"), dimethoxyethane (DME), 1,3-dioxolane (DOX) and mixtures thereof.

The present invention will now be described through the following examples and is not limited thereto.

Fabrication of Cathode

To acetonitrile were added 67.5% by weight of simple substance sulfur, 11.4% by weight of ketjen black, 21.1% by weight of poly(ethyleneoxide) and homogenized, giving a slurry. The obtained slurry was cast onto a carbon-coated aluminum current collector, dried to remove acetonitrile, and rolled. Here, an energy density per unit area was 1.1 mAh/cm². Finally, a cathode was fabricated.

Fabrication of Anode

To be used as an anode, lithium was deposited to a copper foil to a thickness of 20 μm.

Preparation of Electrolytic Solution

As an organic solvent used in an electrolytic solution, a mixed solvent of methoxyethane/diglyme/dioxolane mixed in a volume ratio of 4:4:2 was used. As a lithium salt, 1.15 M $LiCF_3SO_3$ was used.

EXAMPLE 1

A 25 μm thick polypropylene separator was dried at a vacuum oven of 40° C. for longer than one day and used as a separator. Metallic lithium contained in a molybdenum boat was placed in a deposition chamber, a pressure was reduced to reach $10^{-6}$ Torr and then thermal deposition of lithium on the surface of the separator was carried out. For adjustment of thickness, a thickness monitor was used. A deposition thickness was set to 5000 Å. After deposition of metallic lithium was completed, nitrogen gas was injected into the chamber until the internal pressure of the chamber reached 10 Torr. Immediately after injecting nitrogen, a weight displayed on the thickness monitor began to increase, suggesting that nitrogen reacted with lithium to form lithium nitride ($Li_3N$). When the thickness monitor displays that there was no further increase in weight, the reaction was further carried out for approximately 1 minute. Then, the separator/lithium nitride deposited structure was taken out and the surface thereof was observed by naked eye, confirming that red lithium nitride was uniformly formed. Then, a cell was manufactured using the pre-fabricated cathode, anode, the separator/$Li_3N$ and the electrolytic solution.

EXAMPLE 2

A cell was manufactured in the same manner as in Example 1 except that a separator deposited with a lithium oxynitride (LiPON) film (separator/LiPON) was used as a separator. The separator/LiPON was prepared as follows. Using $Li_3PO_4$ target having a diameter of 4 inches, a 2000 Å thick LiPON film was deposited on a 25 μm thick polypropylene separator at a nitrogen atmosphere under conditions of 5 mTorr in pressure and 200 W RF Power for 2 hours.

COMPARATIVE EXAMPLE

A cell was manufactured in the same manner as in Example 1 except that a polypropylene separator was used instead of separator/lithium nitride.

EXPERIMENTAL EXAMPLE: SELF DISCHARGE SUPPRESSION

A self discharge suppressing effect was investigated using cells manufactured in Examples 1 and 2 and Comparative Example. Charging/discharging conditions of a cell were as follows. That is, each cell was charged at 0.2 C until the charge capacity reached 120% and then was discharged at 0.1 C until the discharge voltage reached 1.5 V.

The open circuit voltage (OCV) measured after fabricating the cell prepared in Example 1 was 3.17 V and then the cell was charged and discharged twice and left to stand at room temperature for one weak. Then, self-discharge rate was measured. That is, after the cell was left at room temperature for one week, the cell was discharged to measure a decrease of capacity. The result showed that 20% of the capacity was decreased.

The capacity of the cell prepared in Example 2 decreased approximately 24% compared to that before left at room temperature for one week.

In Comparative Example, a capacity decrease was approximately 50%.

Figure 4:
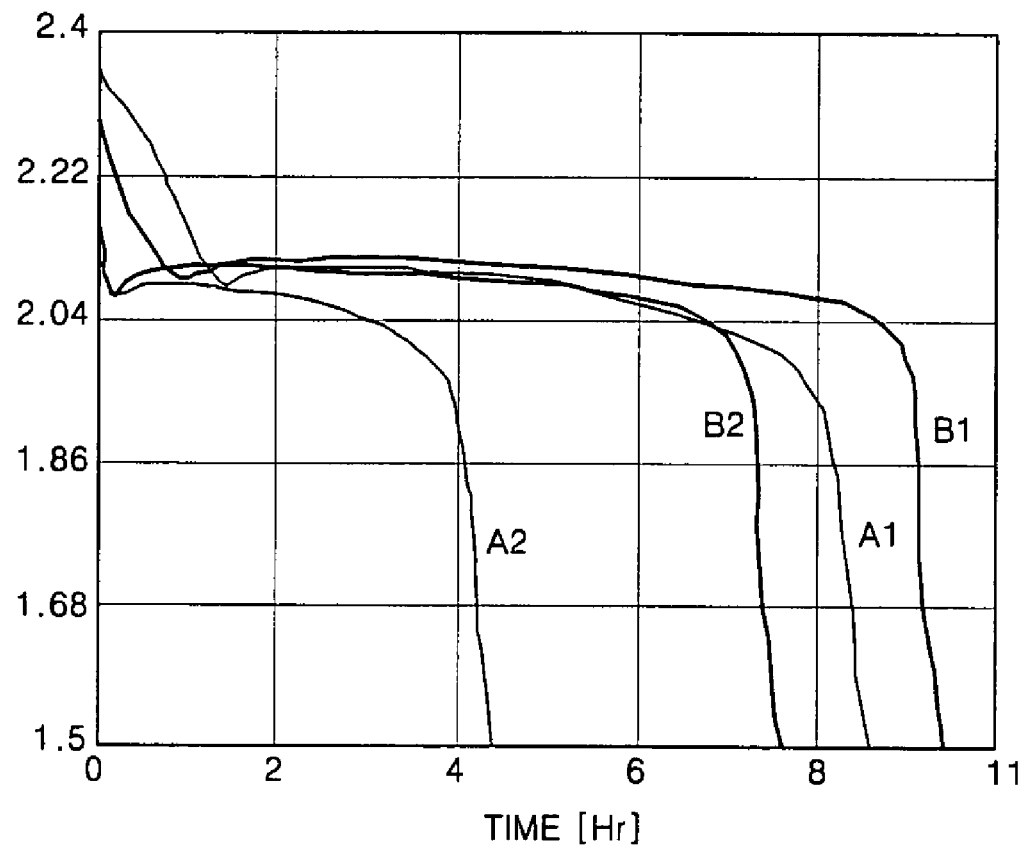
FIG. 4 shows discharge curves of cells prepared in Example 1 and Comparative Example.

FIG. 4 shows discharge curves of cells prepared in Example 1 and Comparative Example, in which A1 and A2 are discharge curves for cells prepared in Comparative Example, B1 and B2 are discharge curves for cells prepared in Example 1. In detail, A1 and B1 are discharge curves of the cells before left to stand for one week, and A2 and B2 are discharge curves of the cells after left to stand for one week. A change in discharge voltage between a cell using separator/lithium nitride and a cell using a conventional separator was not big, suggesting that internal resistance due to lithium nitride is negligible.

Figure 5:
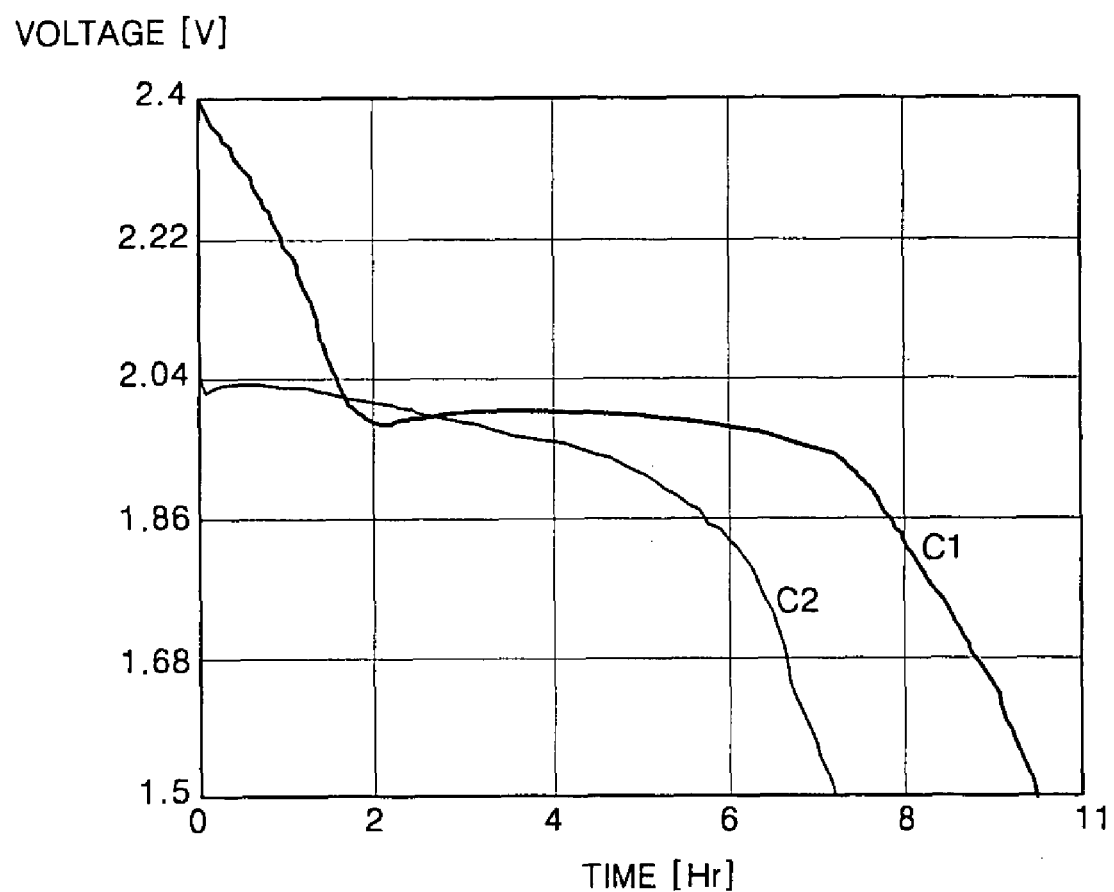
FIG. 5 shows discharge curves of cells prepared in Example 2.

FIG. 5 shows discharge curves of cells prepared in Example 2 before and after left to stand for one week, indicated by C1 and C2, respectively. Referring to FIG. 5, discharge voltages of the cells prepared in Example 2 were slightly reduced compared to the case of a cell using only a separator used in Comparative Example (A1 and A2 in FIG. 4).

According to the present invention, an inorganic protective film is formed on the surface of a separator to form a separator/inorganic film structure, thereby suppressing movement of a cathode active material. If the separator/inorganic film structure inhibits movement of the cathode active material, self discharge and a reduction in capacity of a battery can be suppressed. Therefore, the present invention can be more effectively applied to lithium batteries.

What is claimed is:

1. A lithium battery comprising:
   a cathode;
   an anode; and
   a separator interposed between the cathode and the anode, wherein a protective film of lithium nitride having a thickness of 0.01 to 5 μm is formed on at least one surface of the separator, and wherein the separator bearing a protective film of lithium nitride is a polyethylene separator, a polypropylene separator, a polyethylene/polypropylene double-layered separator, a polyethylene/polypropylene/polyethylene triple-layered separator, a polypropylene/polyethylene/polypropylene triple-layered separator, glass fiber filter paper, or a ceramic separator.

2. The lithium battery of claim 1, wherein the protective film of lithium nitride has a thickness of 0.1 to 1 μm.

3. The lithium battery of claim 1, wherein the protective film of lithium nitride is formed by gas reaction, thermal deposition, sputtering, chemical vapor deposition, plasma enhanced chemical vapor deposition, laser enhanced chemical vapor deposition, ion plating, cathodic arc, jet vapor deposition or laser ablation.

* * * * *